United States Patent

Spanel et al.

[15] 3,704,544
[45] Dec. 5, 1972

[54] GROUND COVER SHEET

[72] Inventors: Abram N. Spanel, Princeton, N.J.; Roy P. Terry, Jr., Columbus, Ga.

[73] Assignee: Abram N. Spanel, a part interest

[22] Filed: Sept. 28, 1970

[21] Appl. No.: 75,930

[52] U.S. Cl..............................................47/9, 47/56
[51] Int. Cl. .................................................A01g 1/00
[58] Field of Search.....47/1, 9, 56, 58; 111/1, DIG. 1

[56] References Cited

UNITED STATES PATENTS

| | | | |
|---|---|---|---|
| 1,971,504 | 8/1934 | Pratt | 47/56 |
| 526,512 | 8/1894 | Weber et al. | 47/56 |
| 1,912,914 | 6/1933 | O'Brien | 47/56 UX |
| 3,315,408 | 4/1967 | Fisher | 47/9 |

FOREIGN PATENTS OR APPLICATIONS

| | | | |
|---|---|---|---|
| 936,554 | 9/1963 | Great Britain | 47/56 |

*Primary Examiner*—Robert E. Bagwill
*Attorney*—Woodcock, Washburn, Kurtz & Machiewicz

[57] ABSTRACT

A ground cover sheet for protection against soil erosion is provided with a plurality of recesses, portions of which are moisture-permeable for controlled flow of water through the permeable portions to the soil beneath. The recesses are formed by the strands of an open mesh web adhesively secured to a relatively thin paper-tissue, preferably of the wet-strength type, the adhesive itself being a plant food and which may contain added fertilizer for feeding plants.

3 Claims, 4 Drawing Figures

PATENTED DEC 5 1972
3,704,544
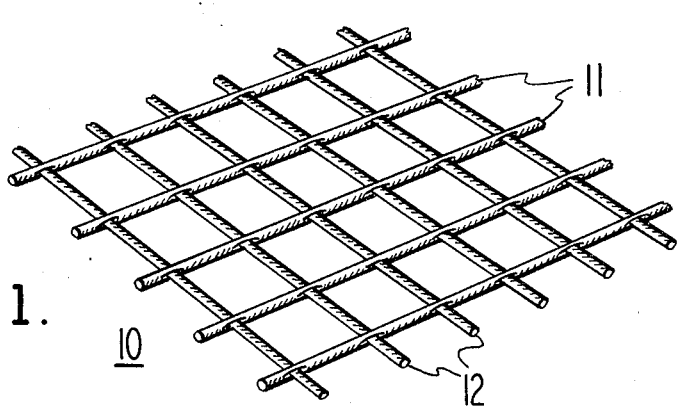
Fig. 1.
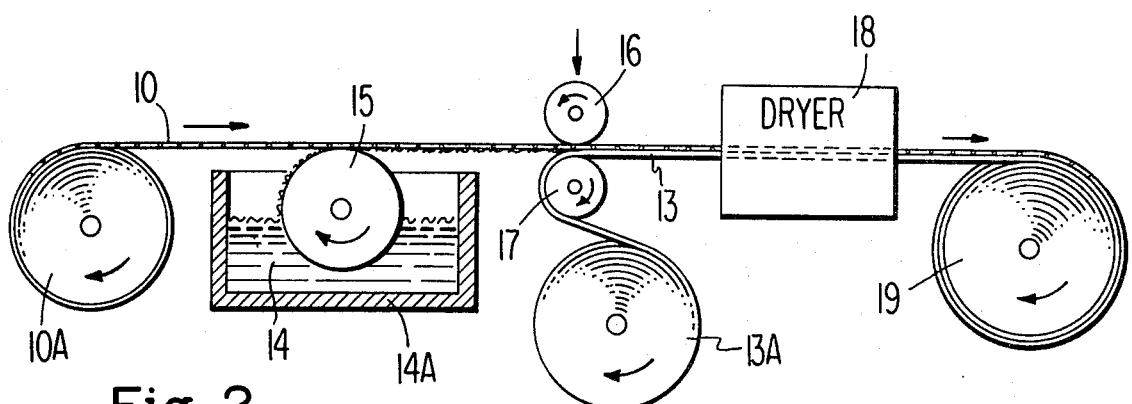
Fig. 2.
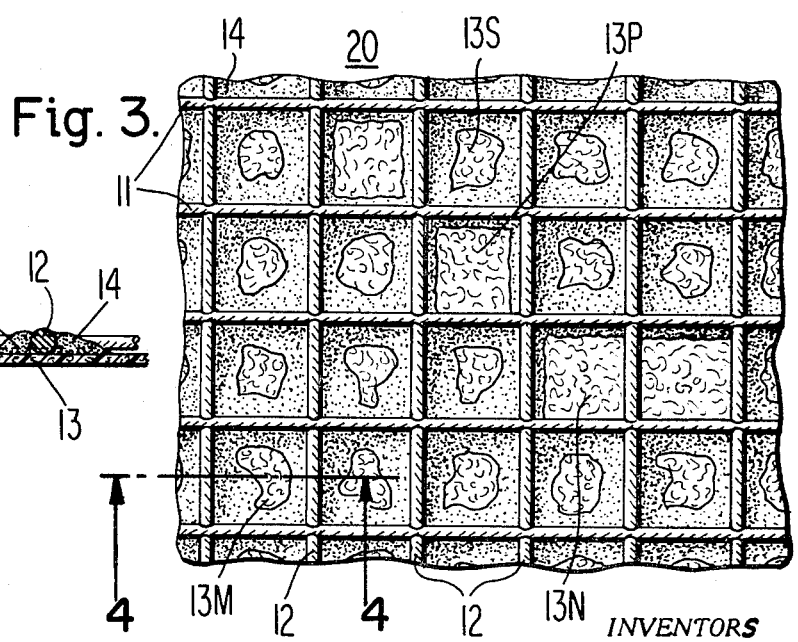
Fig. 3.
Fig. 4.
INVENTORS
Abram N. Spanel &
Roy P. Terry, Jr.
BY
woodcock, Washburn, Kurtz & Mackiewicz
ATTORNEYS

GROUND COVER SHEET

BACKGROUND OF THE INVENTION

This invention relates to ground cover sheets of the type heretofore utilized to control soil erosion during the time of germination of seeds, and has for an object the provision of an improved ground cover sheet.

In the growing of grass and other crops it has long been known that after the planting of the seed heavy rain will not only cause soil erosion itself but will in many cases wash the seeds away and require numerous replantings before a successful crop can be started. There have been many proposals for ground cover sheets such as Fisher patent 3,315,408 together with the concept of including as part of the cover sheet the seeds themselves. It has also been proposed to include fertilizer and either acidifying or neutralizing agents depending upon the character of the soil to aid in seed growth.

The present invention has for a principal object the provision of a ground cover sheet which is low in cost, effective in use, and which not only protects from soil erosion problems, including protection from heavy rains washing away of the seeds and germinating plants, but also provides for what may be deemed the controlled flow of moisture to the soil, a factor needed during and immediately following germination of the seed. In addition, and without adding to the cost thereof, provision is made for gentle fertilization of the seed to promote growth after germination.

BRIEF SUMMARY OF THE INVENTION

The present invention is characterized by means forming over one face of a relatively thin paper-tissue, preferably of the wet-strength type, of a plurality of moisture retaining recesses, portions of which are relatively permeable and portions of which are relatively moisture-impermeable. This is accomplished by utilizing an open mesh web with an adhesive applied to the web in quantity to form a bond between the paper and strands of the open mesh web and also to provide relatively moisture-impervious boundaries for the recesses in proximity to the strands. The plurality of recesses having the moisture-permeable portions provide provide water-receiving areas which during a rain or during watering of the area, will provide controlled flow, i.e., gradual transference, of water to the ground beneath. Thus the soil covered by the ground sheet is at all times shielded from driving, eroding rains. On the other hand, during dry spells, drying of the soil is delayed. Adequate moisture with a minimum of watering will be achieved to promote growth of the seeds and growth of the small plants from germinated seeds.

In a preferred form of the invention the adhesive at least in part is of a material which is a plant food or fertilizer and preferably is slowly water soluble. Thus, as the water drains from the recesses some of the fertilizer, in solution, is applied to the soil which has been seeded for growth of plants.

DESCRIPTION OF THE DRAWINGS

For further objects and advantages of the invention reference is to be had to the following detailed description taken in conjunction with the accompanying drawings in which FIG. 1 is an isometric view of a preferred form of webbing;

FIG. 2 diagrammatically illustrates the method of producing the ground cover sheet embodying the present invention;

FIG. 3 is a plan view of a portion of the cover sheet, and

FIG. 4 is a sectional view taken on the line 4—4 of FIG. 3.

DESCRIPTION OF A PARTICULAR EMBODIMENT

Referring to the drawings, a fractional part of a ground sheet 20 embodying the present invention is shown in FIG. 3. By reference to the sectional view of FIG. 4, it will be seen that it comprises a bottom or ground-contacting layer 13 of a porous cellulosic sheet shown as a thin paper-tissue of the wet-strength type. To the upper face of the tissue 13 there is adhesively secured an open mesh web 10, preferably of Leno weave. The strands 11 extending in one direction are twisted about the strands 12 extending generally at right angles thereto. Though other types of weaving may be utilized, as the typical warp and woof, the Leno weave is preferred since the open mesh web is generally flatter than would be the case if with the over-and-under type of construction. The adhesive 14 is present not only in quantity substantially to coat the strands of the open mesh web but also in sufficient excess to form in conjunction with the webs a plurality of recesses, portions of which are relatively permeable. Because of some variations in the processing steps, later to be described, some of the permeable portions such as at 13N may be of relatively large extent and may actually join an adjacent permeable area. Others like the permeable area 13P may be surrounded on three sides by an impervious adhesive boundary and other areas such as 13M and 13S will be wholly surrounded by adhesive. The area 13M, permeable to moisture, is shown in FIG. 4 to be at the bottom of a recess of significant size for controlled flow of moisture to the soil below.

Heretofore, insufficient attention has been given to the control of the moisture content of the soil in which the seeds are to germinate. By providing throughout the area of the sheet a plurality of relatively moisture-impervious areas surrounding a like plurality of moisture-pervious areas, there is achieved moisture control effective during slashing rains as well as during drought. The multiplicity of recesses with the adhesive slightly spread outwardly of the threads of the fabric is important in its addition of strength to the paper layer 13 to resist slashing rains. Thus the controlled porosity including moisture-transferring recesses forming a great number of small reservoirs all contribute to the protection of the seeded area during both heavy rains and drought conditions.

From the foregoing, it will be seen that during a gentle rain there may be little flow of water over the cover sheet and away from the seeded area since the multiplicity of moisture-permeable recesses provide for the controlled flow of water through the porous cover sheet. On the other hand, during heavy sprinkling or heavy rain there will be a flow of water over the porous cellulosic sheet and away from the seeded area to protect it from erosion and washing away of the dirt around the roots of the seedling plants. Another factor minimizing the erosion problem during a heavy rain or heavy sprinkling is the multiplicity of moisture-impervious areas. However, the many small areas through which water will flow into contact with the earth provide for saturating the adjacent earth lying below the rather extensive moisture-impervious areas. The latter areas nevertheless receive some of the fertilizing material since it will be in solution.

In the preferred form of the invention the adhesive itself is of a plant-foot material such as urea or casein or a mixture thereof. Both are water-soluble substances and both have fertilizing values as plant foot for the seedlings. Thus the adhesive-fertilizing materials will gradually be dissolved by contact with the water within the recesses the permeable portions of which provide controlled flow of such solutions of fertilizer to the soil and to the seedlings which appear upon germination of the seeds.

Whether the adhesive be casein or of the urea type, or of other water-soluble types, it is contemplated that there may be added to it conventional fertilizer components to provide needed phosphoric acid and potash in addition to nitrogen. In general, for seedlings, the nitrogen content will be kept low and the other ingredients of higher relative proportion, as well understood by those skilled in the art.

More particularly, potash will preferably be added to the urea type of adhesive to increase the ratio of potash to nitrogen. As for casein, it will be preferable to add both potash and a small amount of nitrogen both in water-soluble form.

It will be clear that other fertilizers in various combinations not mentioned here may be included in mixture with the adhesive.

Though the mesh of the fabric or web layer may be widely different, it is preferred that the spacing between the strands will be of the order of ¼ of an inch. If larger, then the cellulosic sheet should be made correspondingly stronger. If much smaller than ¼ of an inch, then there must be much closer control of the flow of adhesive so as to not render impervious a majority of the moisture-transferring recesses.

In producing the ground cover sheet 20 of FIG. 3, a supply roll 10A of the open mesh web 10 is withdrawn by driving rollers 16 and 17 by way of an adhesive applying roll 15. This roll is partly immersed in a conventional reservoir 14A containing the adhesive 14 of the type described above and including the added fertilizing components as desired. It will be understood that the adhesive applying assembly is in part conventional. In most cases there will be omitted the usual doctor blade and for the reason that in accordance with the present invention more than the usual amount of adhesive is to be utilized in order to provide the reinforced areas adjacent the strands of the web and to form parts of the moisture-receiving recesses.

It will be observed that the adhesive thoroughly coats the underside of the web 10 and in the vicinity of the driving rolls 16 and 17 intersects the path of the thin sheet of tissue 13 supplied from supply roll 13A by way of the driving roller 17. These two rollers as indicated by the arrow provide the needed spacing so that the web is firmly pressed against the sheet but not so firmly as to spread the adhesive and fill the spaces bounded by the strands of the web. Preferably the two strips 10 and 13 now being bonded together are passed though a dryer 18 for setting the adhesive in preparation to the winding of the cover sheet 20 onto the take-up roll 19.

As described above, all components of the ground cover sheet after a period of time exposed to moisture and to microorganisms such as soil bacteria will decompose, making it wholly unnecessary to remove the ground cover sheet after it has once been applied.

What is claimed is:

1. A ground cover sheet comprising:
    a porous cellulosic sheet; and
    an open mesh web of a decomposable material secured to said sheet by means of a slowly water soluble adhesive, thus forming recesses within confining strands of said web, said adhesive extending from a majority of said strands into said recesses predetermined distances so as to provide areas of predetermined degrees of water porosity of said recesses.

2. The ground cover sheet of claim 1 wherein said water soluble adhesive is preferably selected from the group consisting of urea, casein, or a mixture thereof.

3. The ground cover sheet of claim 1 wherein said water soluble adhesive additionally comprises plant nutrients.

* * * * *